May 12, 1964 — E. YEE — 3,132,432
FRAME ASSEMBLY
Filed June 22, 1961
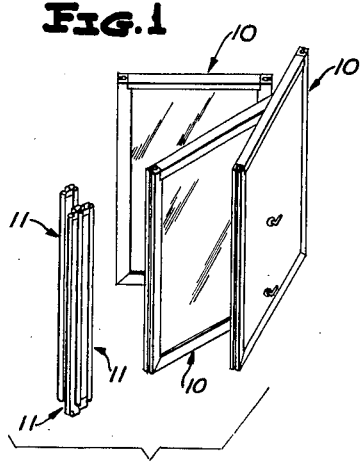
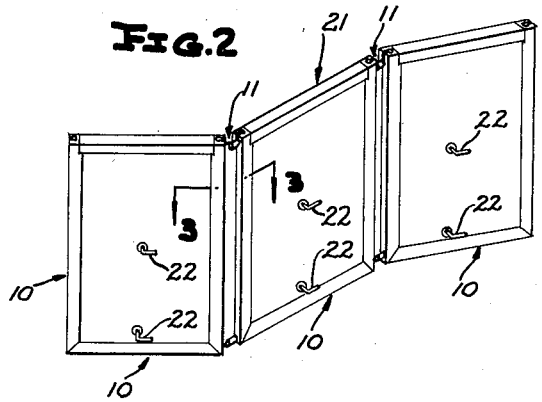
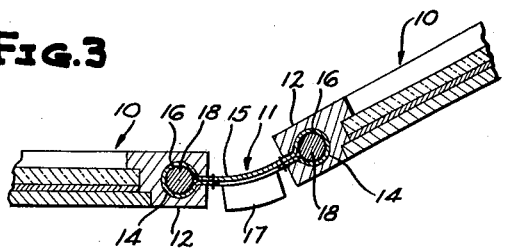
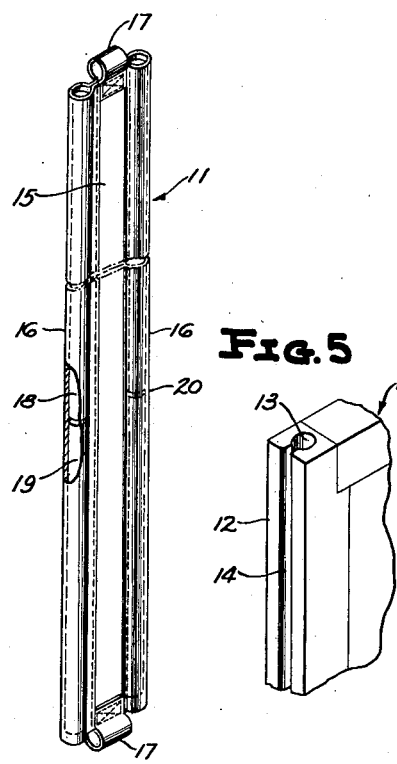
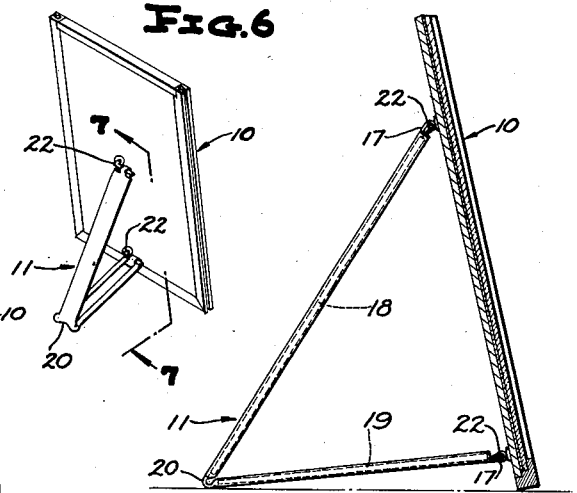
INVENTOR
ELBERT YEE
BY Roy A. Plant
ATTORNEY

United States Patent Office 3,132,432
Patented May 12, 1964

3,132,432
FRAME ASSEMBLY
Elbert Yee, 342 Pleasant View, Battle Creek, Mich.
Filed June 22, 1961, Ser. No. 118,925
3 Claims. (Cl. 40—152.1)

The present invention relates broadly to new and useful improvements in frame assemblies, and more particularly to a novel frame assembly of the type wherein individual frames may be readily added to or removed from a frame assembly to provide a varied arrangement of frames.

Hingedly connected multiple picture frames are very common, and the standard construction has permanent rigid hinges between frames with no provision for the easy removing or adding of further individual frames to the series, or for that matter for the easy substitution of a different frame for one of those in the initial multiple picture frame series. It was a recognition of this problem and the need of a more easily changed multiple picture frame series, together with the lack of same commercially on the market, which led to the conception and development of the present invention.

While this invention is particularly related to picture frames, it may just as well be utilized in conjunction with other types of frames, including mirrors, floor screens, et cetera. Accordingly among the objects of the present invention is the provision of a construction which permits individual frames to be readily connected together or disconnected from a series of same, whereby any desired number of frames may be assembled into a frame assembly and wherein individual frames may be added and subtracted from the frame assembly anywhere in the series, as desired, and each frame may be provided with attached means to prop the same in an upright position with the frames standing either in series or alone.

Another object of this invention is to provide a novel frame assembly which includes a multiplicity of individual frames each having longitudinally extending grooves formed in the sides thereof, and connecting strips, each connecting strip having an enlargement along each side edge thereof to be received within a groove of an associated frame with the connecting strips serving to flexibly connect together the frames and forming a hinge therebetween wherein the frames may be disposed in angular relation to each other.

Another object of this invention is to provide a novel connecting strip for connecting together individual frames of the multiple frame assembly wherein the frames may be disposed in desired angular relation to each other, the connecting strip also being of a construction wherein it may be attached to the back of a frame to function as a prop to support a single frame in easel manner.

Another object of this invention is to provide a novel frame assembly wherein individual frames are provided with longitudinal grooves in the sides thereof and are connected together by a connecting strip, the connecting strip serving to hingedly connect together the frames and each connecting strip being removable and being suitably reinforced and provided with a single generally central cross hinge wherein the connecting strip may be folded upon itself and readily attached to the rear of a single frame to serve as a prop therefor.

A further object of this invention is to provide a novel prop assembly for a frame which includes a strip which may be used to secure together a multiplicity of frames, the strip having an intermediate transverse hinge portion and being provided at opposite ends thereof with transverse loops which are engaged on hooks secured to the back of an associated frame.

A further object of this invention is to provide a novel strip which may be used selectively for connecting together frames, or as a prop for supporting a single frame.

A still further object of this invention is to provide a novel connecting strip which includes a flat flexible central portion having longitudinally extending loops at opposite sides thereof and transversely extending loops at the ends thereof, the longitudinally extending loops having received therein reinforcing rods with each loop having two reinforcing rods wherein the connecting strip has a transverse hinge portion intermediate its ends, the transverse loops being receivable over hooks wherein the connecting strip may serve as a prop for a frame, with the connecting strip being otherwise constructed for connecting together adjacent side edges of frames so that a multipliciy of frames may be assembled as a unit.

Still further objects and advantages of this invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, the disclosed means illustrating, however, but several of the various ways in which the principle of the invention may be used.

In the annexed drawing:

FIGURE 1 is an exploded perspective view showing a multiplicity of frames and connecting strips ready to be assembled.

FIGURE 2 is a rear perspective view showing a multiplicity of frames connected together to form a frame assembly.

FIGURE 3 is an enlarged fragmentary horizontal sectional view taken along the line 3—3 of FIGURE 2, looking in the direction of the arrows, and shows the specific details of a connection between two adjacent frames, there also being shown the details of a connecting strip between the frames.

FIGURE 4 is an enlarged perspective view of a preferred form of one of the connecting strips with an intermediate portion thereof being broken away and a further portion thereof being broken away and shown in section to clearly illustrate the arrangement of reinforcing rods therein.

FIGURE 5 is an enlarged fragmentary perspective view showing the details of a groove formed in a side edge of a frame.

FIGURE 6 is a rear perspective view of a supported single frame utilizing one of the connecting strips as a prop.

FIGURE 7 is an enlarged fragmentary vertical sectional view taken along the line 7—7 of FIGURE 6, looking in the direction of the arrows, and shows further the details of the propped frame.

Referring now to the drawings in detail, it will be seen that there is illustrated in FIGURE 1 a multiplicity of individual frames and connecting strips. The frames are identical and each frame is generally referred to by the numeral 10. The connecting strips are also identical, and each connecting strip is generally referred to by the numeral 11. The frames may be of any construction, although the frames 10 illustrated in the drawing are particularly adapted as picture frames.

Reference is now made to FIGURE 5 in particular, wherein it is shown that a side frame element 12 of a typical frame 10 is provided with a longitudinal groove 13. The groove 13 is preferably circular in cross-section, although it may be of other configurations. The groove 13 has a narrow opening or slit 14 through the side wall of the side frame element 12. It is to be understood that the side frame elements 12 of all of the frames 10 will be constructed in a similar manner.

Reference is now made to FIGURE 4 in particular, wherein the details of a typical connecting strip 11 are shown. Each connecting strip 11 is formed of a flexible cloth-like material and depending upon the cost of the connecting strip 11, it may be formed of cloth, plastic, a simulated leather material, or a high quality leather. In any event, each connecting strip 11 includes a flat flexible central portion 15 having a pair of integrally formed, longitudinally extending side loops 16 disposed on opposite sides of the central portion 15. The connecting strip 11 is also provided with integrally formed, transversely extending loops 17 at opposite ends of the central portion 15. The loops 17 are very short as compared to the loops 16.

The connecting strip 11 is reinforced by rods 18 and 19. These rods are of any desired length to provide a suitable hinge portion 20 extending transversely of the connecting strip 11 intermediate the ends thereof so that the connecting strip 11 may be folded or hinged upon itself. Where the frame hooks 22 are placed substantially in the position shown in the drawing, the rods 18 and 19 of each side loop may be made substantially of the same length as shown in FIGURE 7 and of course, for each connecting strip both rods 18 are of substantially the same length, and rods 19 are likewise of substantially the same length to facilitate hinge action.

When it is desired to connect together a multiplicity of the frames 10 to form a frame assembly composed of single frames, as is typically shown in FIGURE 2, two or more of the frames 10 are connected together by connecting strips 11. The resultant multiple frame assembly, here involving three frames, for instance, is generally referred to by the numeral 21. When a pair of frames 10 are connected together by a connecting strip 11, the loops 16, reinforced by the rods 18 and 19, which facilitate assembling, are inserted in the grooves 13 in the side frame elements 12 with the flat central portion 15 of the connecting strip 11 extending through the openings 14, as is shown in FIGURE 3. The flat central portion 15 being flexible, it will be readily apparent that the frames 10 may be readily disposed in any desired angular relationship to each other. Thus, a multiplicity of the frames 10 are combined to be self-supporting.

It will be readily apparent that due to the special construction of the frames 10 and the connecting strips 11, any number of frames 10 may be connected together to form a frame assembly similar to the three unit frame assembly 21 of FIGURE 2. Further, when it is desired to add a frame to the frame assembly or to remove a frame therefrom, this may be readily accomplished when connectors in the form of connecting strips 11 are used.

It is to be noted that the frames 10, FIGURE 2, have a pair of vertically aligned hooks 22 secured to the backs thereof. These hooks are of a very simple construction and are adapted to be received in the loops 17 at the opposite ends of the connecting strip 11. As is best shown in FIGURES 6 and 7, when it is desired to support a single frame 10, one of the connecting strips 11 is folded upon itself along the hinge portion 20 and the loops 17 at the opposite ends thereof are engaged over the hooks 22. The connecting strip 11, instead of acting as a hinge, now functions as a prop for the supporting of a single frame 10 in an upright position. The same props can be used equally well to support the backs of a multiplicity of frames with all supported at a common backward inclination rather than being in the conventional angularly side hinged position.

Because of the fact that the connecting strips 11 may be utilized to support a single frame 10, it will be readily apparent that when it is desired to remove a frame from the multiple frame assembly 21 and support the frame as an individual element, it is merely necessary to remove the connecting strip 11 holding the frame 10 as part of the frame assembly 21, and then attach the same connecting strip 11 to the rear of the frame 10 through the use of the hooks 22, at which time the connecting strip 11 becomes a prop and serves to prop the frame 10 in the normal upright, slightly rearwardly sloping position. When it is desired to add a propped individual frame 10 to a multiple frame assembly 21, the connecting strip 11 is removed from the rear thereof and is used to assemble the same as part of a frame assembly.

It will be readily apparent that due to the novel construction of the connecting strips 11, as well as the special adaptation of the frames 10 thereto, a multiplicity of frames may be selectively connected together as a multiple frame assembly or propped as individual frames without requiring any additional accessories other than the connecting strips 11.

From the foregoing, it will be readily apparent that there has been disclosed a simple embodiment of the invention suitable for carrying out the desired ends. However, it is apparent that equivalent modifications may be made in the disclosed invention and which will fall within the spirit and scope of the invention as herein shown and described.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. A self-supporting frame assembly for carrying decorative panels, said assembly including a generally polygonal frame having means for carrying a panel of sheet material, a back part for said frame, a flexible supporting member for said frame, said supporting member being formed as a narrow elongated web of flexible material, said supporting member having rolled edges on all four sides, and a pair of stiff inserts arranged lengthwise in each of the sleeves formed by the rolled edges along the long sides of said flexible member and extending substantially the full length of each of said members, said inserts being shorter than the sleeves in which they are contained to provide a flexible non-supported part at the juncture of two such inserts so that said member may be bent at an angle while forming an otherwise rigid structure.

2. The frame assembly defined in claim 1 further including stiff elements mounted on said backing part and adapted to be inserted in the sleeves formed along the narrow sides of said member, said elements being spaced on said backing part so that the two narrow sides of said member may be removably attached to said backing part, said member being bent at the juncture of said two inserts to form an easel for said frame.

3. The frame structure defined in claim 2 wherein said frame structure is provided with edges having elongated slots formed therein for receiving the rolled edges of said rigid inserts contained therein, the rolled member with the rigid inserts contained therein, the rolled edges of a member being inserted in the slots of two adjacent frame structures to connect them as a hinge.

References Cited in the file of this patent

UNITED STATES PATENTS

| | | |
|---|---|---|
| 1,851,917 | Maggio | Mar. 29, 1932 |
| 2,210,652 | Dennett | Aug. 6, 1940 |
| 2,367,071 | Tarlitz | Jan. 9, 1945 |
| 2,590,744 | Woodbury | Mar. 25, 1952 |
| 2,758,402 | Fulmer | Aug. 14, 1956 |

FOREIGN PATENTS

| | | |
|---|---|---|
| 953,035 | Germany | Nov. 22, 1956 |

UNITED STATES PATENT OFFICE
CERTIFICATE OF CORRECTION

Patent No. 3,132,432　　　　　　　　　　　　　　May 12, 1964

Elbert Yee

It is hereby certified that error appears in the above numbered patent requiring correction and that the said Letters Patent should read as corrected below.

In the heading to the printed specification, line 3, for "342 Pleasant View, Battle Creek, Mich." read -- Battle Creek, Mich. (11908 Tildenwood Drive, Rockville, Md.) --; column 4, line 35, for "back" read -- backing --.

Signed and sealed this 20th day of October 1964.

(SEAL)
Attest:

ERNEST W. SWIDER　　　　　　　　　　　　　　EDWARD J. BRENNER
Attesting Officer　　　　　　　　　　　　　　Commissioner of Patents